(12) United States Patent
Andreussi et al.

(10) Patent No.: US 11,180,396 B2
(45) Date of Patent: Nov. 23, 2021

(54) SEPARATION OF TWO FLUID IMMISCIBLE PHASES FOR DOWNHOLE APPLICATIONS

(75) Inventors: Paolo Andreussi, Pisa (IT); Domenico Antonio Direnzo, Casirate D'adda (IT)

(73) Assignee: ENI S.P.A., Rome (IT)

( * ) Notice: Subject to any disclaimer, the term of this patent is extended or adjusted under 35 U.S.C. 154(b) by 318 days.

(21) Appl. No.: 13/976,322

(22) PCT Filed: Dec. 28, 2011

(86) PCT No.: PCT/EP2011/074190
§ 371 (c)(1),
(2), (4) Date: Aug. 6, 2013

(87) PCT Pub. No.: WO2012/089785
PCT Pub. Date: Jul. 5, 2012

(65) Prior Publication Data
US 2013/0313200 A1    Nov. 28, 2013

(30) Foreign Application Priority Data

Dec. 29, 2010    (IT) .......................... MI2010A002451

(51) Int. Cl.
*C02F 9/00*    (2006.01)
*C10G 33/06*    (2006.01)
(Continued)

(52) U.S. Cl.
CPC ............ *C02F 9/00* (2013.01); *B01D 17/0211* (2013.01); *B01D 17/045* (2013.01); *C10G 33/06* (2013.01); *E21B 43/385* (2013.01)

(58) Field of Classification Search
CPC ...... C02F 9/00; C02F 1/02; C02F 1/24; C02F 1/38; C02F 1/40; C02F 1/5209;
(Continued)

(56) References Cited

U.S. PATENT DOCUMENTS 4,238,335 A * 12/1980 Grimsley ............... B01D 24/06
210/278
4,921,609 A * 5/1990 Fromson ............ B01D 17/0211
210/521
(Continued)

FOREIGN PATENT DOCUMENTS

EP         1445420 A2    8/2004
WO    2009006672 A1    1/2009

*Primary Examiner* — Bobby Ramdhanie
*Assistant Examiner* — Donovan Bui-Huynh
(74) *Attorney, Agent, or Firm* — Tarolli, Sundheim, Covell & Tummino LLP

(57) ABSTRACT

The present invention relates to a group and method for the separation of a mixture comprising two fluid phases mutually at least partially immiscible and with different specific density characterized in that it comprises a closed chamber (11) which extends between an upper outlet mouth (12a) of a fluid phase with lower specific density separated from the mixture, positioned at a first upper height, and a lower outlet mouth (12b) of a fluid phase with greater specific density separated from the mixture, positioned at a second lower height with respect to the first upper height, an inlet (15,33) for said mixture inside said closed chamber (11) also being present at a height interposed between said upper and lower heights, a first upper gross separation device (13) of said mixture and a second lower fine separation device (14,14') of said mixture, hydraulically connected to each other (13) (14), being situated in succession, inside said closed chamber (11), between said upper outlet mouth (12a) and said lower outlet mouth (12b), the first upper gross separation device (13) comprising a gravitational separation chamber and the at least second lower fine separation device (14,14') comprising at least one coalescence separator (14) and/or at least one hydrocyclone separator (14').

13 Claims, 5 Drawing Sheets

(51) Int. Cl.
*B01D 17/02* (2006.01)
*B01D 17/04* (2006.01)
*E21B 43/38* (2006.01)

(58) Field of Classification Search
CPC ...... C02F 1/5281; C02F 1/56; C02F 2103/32; C02F 2201/008; C02F 2209/005; C02F 2209/06; C02F 2209/11; C02F 2209/40; C02F 2301/024; C02F 2301/026; C02F 2301/066; C10G 33/06; B01D 17/0211; B01D 17/0208; B01D 17/0217; B01D 17/0214; B01D 21/0045; B01D 21/2427; B01D 21/0075; B01D 17/08; B01D 17/045; B01D 21/0042; B01D 21/0057; B01D 21/02; B01D 21/2422; B01D 21/245; B01D 11/0203; B01D 19/0057; B01D 19/0094; B01D 21/0003; B01D 21/0006; B01D 21/0033; B01D 21/0039; B01D 21/0054; B01D 21/0063; B01D 21/0069; B01D 21/0072; B01D 21/14; B01D 21/18; B01D 21/2405; B01D 21/2416; B01D 21/2494; B01D 21/34; B01D 2221/04; B01D 24/06; B01D 24/30; B01D 24/40; B01D 24/4689; B01D 46/40; E21B 43/385; E21B 43/36; E21B 43/38; E21B 43/40; Y10S 210/05; F03D 7/0224; F03D 7/04; F24H 1/121; F24H 9/14; F24H 9/1818; F28F 27/00; F28F 3/08; F28F 3/083; B01F 13/1013; B01F 13/1016; B01F 3/0446; B01F 5/0057; B01F 5/0451; B01J 2219/2493; B01J 2219/2495; B03D 1/1431; B03D 1/1462; B03D 1/247; B03D 1/082; B04C 11/00; B04C 5/08; B04C 5/103; B04C 5/13; B60H 1/2221; B60H 2001/2271; B60H 2001/2278; B65D 5/26; B65D 5/4295; B65D 5/46024; F15B 15/17; F15B 1/022; F15B 20/002; F15B 20/004; F15B 2211/212; F15B 2211/27; F15B 2211/30515; F15B 2211/31558; F15B 2211/329; F15B 2211/50518; F15B 2211/5159; F15B 2211/7053; F15B 2211/7054; F15B 2211/7055; F15B 2211/785; F15B 2211/8633; F15B 2211/8752; G05D 16/20; H05B 1/0283; Y10T 137/0324; Y10T 137/7761; F05B 2260/406; F05B 2260/79

See application file for complete search history.

(56) References Cited

U.S. PATENT DOCUMENTS

| | | | | |
|---|---|---|---|---|
| 4,936,990 | A * | 6/1990 | Brunsell | B01D 17/0208 210/331 |
| 5,028,333 | A * | 7/1991 | Wright | B01D 17/0211 210/237 |
| 5,840,198 | A * | 11/1998 | Clarke | B01D 17/0211 210/519 |
| 2002/0153326 | A1 * | 10/2002 | Oddie | B01D 17/0208 210/747.1 |
| 2004/0031608 | A1 | 2/2004 | Hall | |
| 2010/0065251 | A1 * | 3/2010 | Hoglund | F28F 3/083 165/96 |
| 2010/0267976 | A1 * | 10/2010 | Chordia | B01D 11/0203 554/11 |
| 2015/0131979 | A1 * | 5/2015 | Kohl | B60H 1/2221 392/479 |

* cited by examiner

SEPARATION OF TWO FLUID IMMISCIBLE PHASES FOR DOWNHOLE APPLICATIONS

RELATED APPLICATION

This application is a National Phase filing of PCT/EP2011/074190, filed Dec. 28, 2011, and claims priority to Italian Application No. MI2010A002451, filed Dec. 29, 2010, the subject matter of which are incorporated herein by reference in their entirety.

BACKGROUND OF THE INVENTION

The present invention relates to a group and method for the separation of a mixture comprising two fluid phases mutually at least partially immiscible and with different specific density.

It should be noted that, for the purposes of the present invention, "mixture" also indicates a dispersion or a not stable emulsion, and that "fluid phases mutually immiscible" indicates two fluid phases, in particular liquid, which do not give solutions in each other at least in certain ratios.

For the purposes of the present invention, moreover, it cannot be excluded that each of the two fluid phases mutually immiscible can comprise further components, such as, for example, solid particles.

In particular, the present invention relates to a separation group for downhole applications in the oil field, wherein the mixture therefore comprises at least an aqueous liquid phase and an organic liquid phase, the latter comprising oil (hydrocarbons) or oleophilic compounds.

The production of hydrocarbons is in fact often accompanied by the underground production of water. Water is present in the formation and is often considered a waste by-product of hydrocarbons.

During the conventional production of hydrocarbons, oil and water flow towards the surface, through the formation, drillings, pipelines, valves and pumps.

Surface separation has costs which influence the extraction costs especially when the production of water tends to increase with an impoverishment in oil of the well.

An increase in the production of water reduces the potential volume of oil pumped to the surface per unit of time. Many of the production fields of hydrocarbons consequently become economically less convenient and more difficult to maintain due to the excessive associated water production.

In order to face the problem of excessive water production, the most widely-used approach consists in taking advantage of a downhole separation of oil and water produced.

The reinjection into the well of the water produced in the formation (produced water reinjection) therefore represents an evolutionary solution with respect to the management of production water.

According to this solution, the mixture produced is ideally separated into water and oil, so that the water can be sufficiently pure to enable injection into an underground formation and the oil is dehydrated to simplify surface separation systems, at the well head, before being subsequently transported outside the production field.

For this purpose, a separator is typically used, which is configured for application at the downhole, and consequently in particularly reduced spaces, capable of separating an oil production stream containing a significant quantity of water which flows into the well from the production area inside the formation through the production drillings, into two streams of the above liquid constituents.

The oil-enriched stream is then sent towards the surface whereas the water-enriched stream is sent towards the reinjection drillings.

Due to the dynamics of the formation, however, the oil enters the well with the water so that a portion of oil may be in the form of droplets in the water making separation from the aqueous phase even more difficult.

Said oil, if injected with the water into the reinjection area, can cause a partial or total blockage of the reinjection area, with a consequent decline of the reinjection well. The oil must therefore be separated from the aqueous stream with a high degree of efficiency before the aqueous phase is pumped into the reinjection area.

Current downhole separation methods use a variety of mechanisms and apparatuses among which simple filtering systems, cyclone systems and systems with gravitational separation chambers.

There are also separation systems between fluids having different densities based on the coalescence phenomenon which however are not suitable for use at the downhole as they require considerable spaces for obtaining an acceptable separation degree. For applying them at the downhole, it would therefore be necessary to at least effect an enlargement of the well hole, thus proving to be less convenient that a surface separation.

Among current systems used at the downhole, systems based on the gravitational separation phenomenon generally consists of one or more separation chambers where the mixture of fluids is left to pass almost statically for a period of time sufficient for allowing a natural separation of the phases, induced by the force of gravity.

Otherwise, cyclone systems for downhole applications generally consist of a hollow tubular body with dimensions which are such as to allow its positioning at the downhole, which has a reduction in the diameter along its own development coaxial to the well and in which the mixture to be separated is introduced tangentially to the internal wall of the tubular body so as to generate a cyclone. The two fluids with different density are therefore subjected to centrifugal forces of a different entity which induce their separation.

The separation systems currently used at the downhole are not capable of effecting a separation between oil and water which is such as to guarantee a sufficient degree of purity of the water stream capable of limiting the decline of the injectivity.

The decline of the injectivity associated with reinjection, therefore remains one of the greatest problems for the use of current downhole separation systems. It occurs due to solid and liquid particles in the reinjection water, as the solid particles and small drops of oil dispersed in the reinjection water are deposited in the formation, damaging it.

This problem has so far drastically limited the applicability of downhole separation technologies. An increasing necessity is therefore felt for an efficient downhole separation of the water coming from the well fluid.

BRIEF SUMMARY OF THE INVENTION

An objective of the present invention is therefore to overcome the drawbacks mentioned above and in particular to conceive a separation group of a mixture comprising two fluid phases mutually immiscible and with different specific density which can be efficiently and solidly applied at the downhole so as to obtain a separation of the mixture of well fluids into an oil-enriched stream and a deoiled water stream, allowing the production of an oil-enriched stream at the surface and the disposal of the deoiled water in an area of the same well.

A further objective of the present invention is to provide a separation group of a mixture comprising two fluid phases mutually immiscible and with different specific density which allows a separated water stream to be obtained at the downhole having a high degree of purity so as to limit a decline of the infectivity of an oil well in the case of reinjection of the separated water stream into the well.

Another objective of the present invention is to provide a method for the separation of a mixture comprising two fluid phases mutually immiscible and with different specific density which can be efficiently and solidly applied at the downhole.

These and other objectives according to the present invention are achieved by providing a group and a method for the separation of a mixture comprising two fluid phases mutually immiscible and with different specific density as specified in the claims.

Further characteristics of the group and method for the separation of a mixture comprising two fluid phases mutually immiscible and with different specific density are object of the dependent claims.

The characteristics and advantages of a group and method for the separation of a mixture comprising two fluid phases mutually immiscible and with different specific density according to the present invention will appear more evident from the following illustrative and non-limiting description, referring to the enclosed schematic drawings, in which:

DETAILED DESCRIPTION

Figure 1:
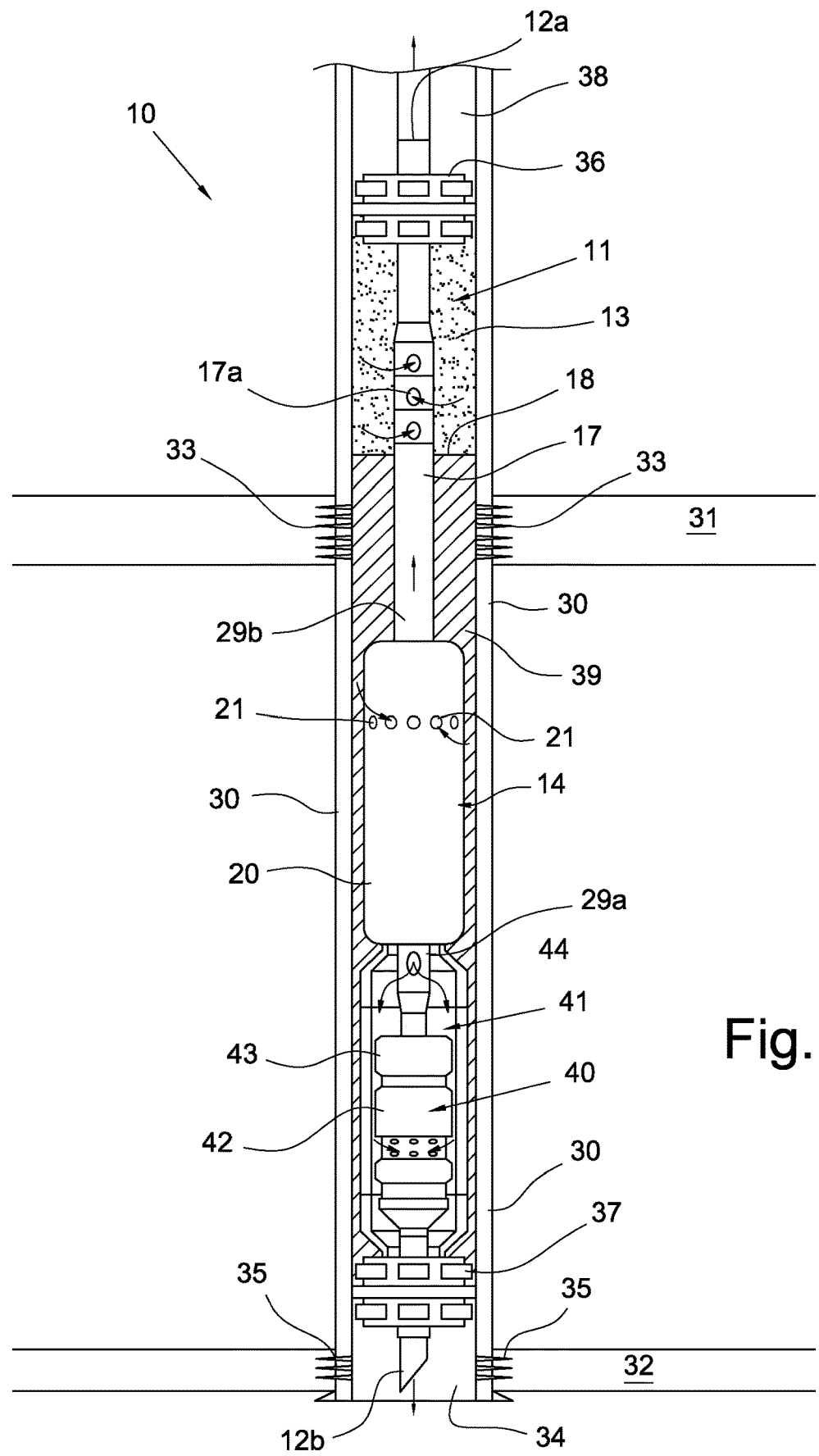
FIG. 1 is an elevational view of a first embodiment of the separation group of a mixture comprising two fluid phases mutually immiscible and with different specific density according to the present invention.

With reference to the figures, these show different embodiments of a separation group of a mixture comprising two fluid phases mutually immiscible and with different specific density, indicated as a whole with 10, in a downhole installation configuration.

The separation group 10 of a mixture comprising two fluid phases mutually immiscible and with different specific density according to the present invention comprises a closed chamber 11 which extends between an upper outlet mouth 12a of the fluid phase with lower specific density separated from the mixture, positioned at a first upper height, and a lower outlet mouth 12b of the fluid phase with greater specific density separated from the mixture, positioned at a second lower height with respect to the first upper height.

An inlet 15,33 for the mixture comprising two fluid phases mutually immiscible and with different specific density inside the closed chamber 11, is also interposed between the heights of the two upper and lower outlet mouths 12a,12b.

According to the present invention, a first upper gross separation device 13 of a mixture comprising two fluid phases mutually immiscible and with different specific density and at least a second lower fine separation device 14,14' of a mixture comprising two fluid phases mutually immiscible and with different specific density, hydraulically connected to each other 14, are situated in succession between the upper outlet mouth 12a and the lower outlet mouth 12b wherein the first upper gross separation device 13 comprises a gravitational separation chamber 13 and the at least a second lower fine separation device 14,14' comprises at least one coalescence separator 14 or at least a hydrocyclone separator 14'.

In this case, the inlet 15, 33 for the mixture is situated in correspondence with the gravitational separation chamber 13.

The gravitational separation chamber 13 and the at least a second lower fine separation device 14,14' are included in the closed chamber 11.

Said closed chamber 11 is delimited laterally by a tubular casing 16, 30 which, in the embodiments illustrated in FIGS. 1, 4 and 5, coincide with the internal pipe coating 30 of an oil well which extends downwards from the surface, passing through an oil-water production area 31 and subsequently in a reinjection area 32.

In these embodiments, the inlet for the mixture comprising two fluid phases mutually immiscible and with different specific density consists of production holes 33 made on the pipe coating 30 of the well.

"Production area" refers to the area from which the production fluid is to be extracted through suitable production holes 33 obtained in the pipe coating 30 in correspondence with said production area itself 31.

"Re-injection area" 32 refers to the area into which the production water, suitably deoiled, is to be injected through suitable re-injection holes 35 obtained in the pipe coating 30 in correspondence with said reinjection area itself 32.

Figure 3:
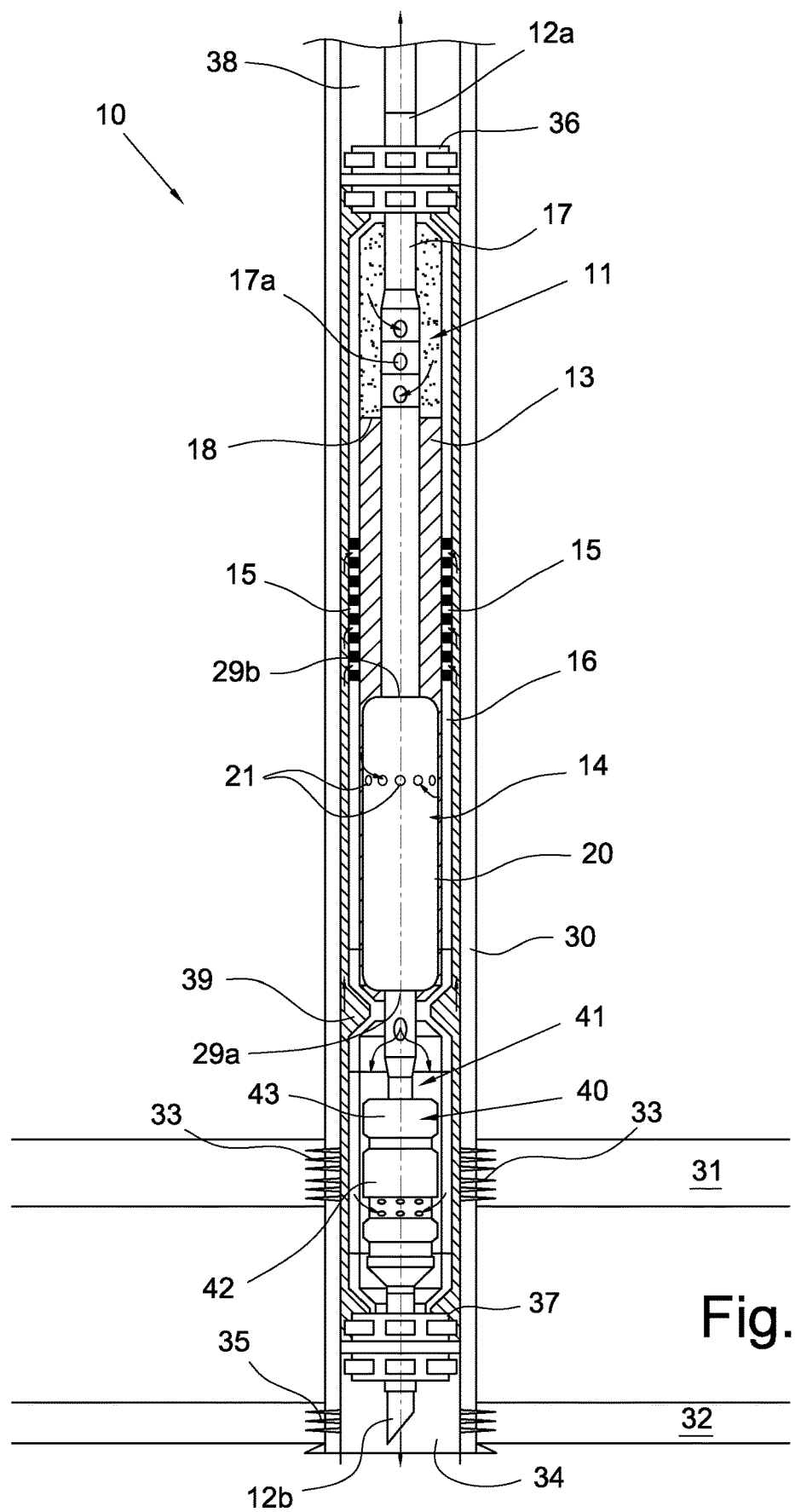
FIG. 3 is a raised view of a second embodiment of the separation group of a mixture comprising two fluid phases mutually immiscible and with different specific density according to the present invention.

In the embodiment illustrated in FIG. 3, a suitable tubular casing 16 is expected, separate from the pipe coating 30 and contained internally and coaxially with respect to the same. In this embodiment, the inlet of the separation group 10 preferably consists of a plurality of inlet holes 15 made on the mantle surface of the tubular casing 16.

In the specific downhole application, the closed chamber 11 is delimited above and below respectively by an upper sealing washer 36 and a lower sealing washer which divide the pipe coating 30 into three sections: a first section 38 of the pipe coating 30 is delimited in the lower part by the first sealing washer and is in communication with the surface, a second section 39 of the pipe coating 30 is delimited in the upper part by the first sealing washer 36 and in the lower part by the second sealing washer 37 and is in fluid communication with the production area 31, and a third section 34 of the pipe coating 30 is delimited in the upper part by the second sealing washer 37 and is in communication with the reinjection area 32.

In this preferred downhole application, the mixture introduced into the gravitational separation chamber 13 is a production fluid consisting of a mixture of oil and water.

Inside the tubular casing 16, 30 and preferably coaxially to the same or following the same development, a conveyance tube 17 of the fluid phase is envisaged, with lower specific density (oil), which extends between the upper outlet mouth 12a through the upper gross separation device 13 and connects below with the at least second lower fine separation device 14,14'.

In this specific downhole application, the conveyance tube of the fluid phase with lower specific density 17 extends through the upper sealing washer 36 continuing as far as the surface.

The conveyance tube 17 of the fluid phase with lower specific density is configured so as to define with the tubular casing 16, 30, a gravitational separation chamber with annular section, in which the mixture comprising two fluid phases mutually immiscible and with different specific density introduced through the inlet 15, 33, undergoes a first gravitational separation, being divided into two fluid phases, which, in this specific downhole application, are an oil-enriched phase and a grossly deoiled aqueous phase.

The oil-enriched phase settles above an ideal water-oil interface 18, whereas the aqueous phase still containing small quantities of oil, settles below the water-oil interface 18.

At least one hole 17a is made on the conveyance tube of the fluid phase with lower specific density 17, which puts the gravitational separation chamber 13 in fluid communication with the upper outlet mouth 12a in order to convey the oil-enriched portion towards said first outlet 12a.

For this purpose, suction means (not illustrated) can be provided, associated with the upper outlet mouth 12a.

The at least a second lower fine separation device 14,14' preferably comprises a coalescence separator 14 of the type illustrated in FIGS. 1-4.

The coalescence separator 14 comprises a hollow tubular body 20 on which a plurality of introduction holes 21 is made, preferably distributed in a substantially uniform manner along one or more circular crowns positioned at a certain heights of the tubular body 20 and in fluid communication with the lower part of the gravitational separation chamber 13 in which a mixture is present, consisting of the grossly deoiled aqueous phase, and therefore still containing small quantities of oil.

Figure 2:
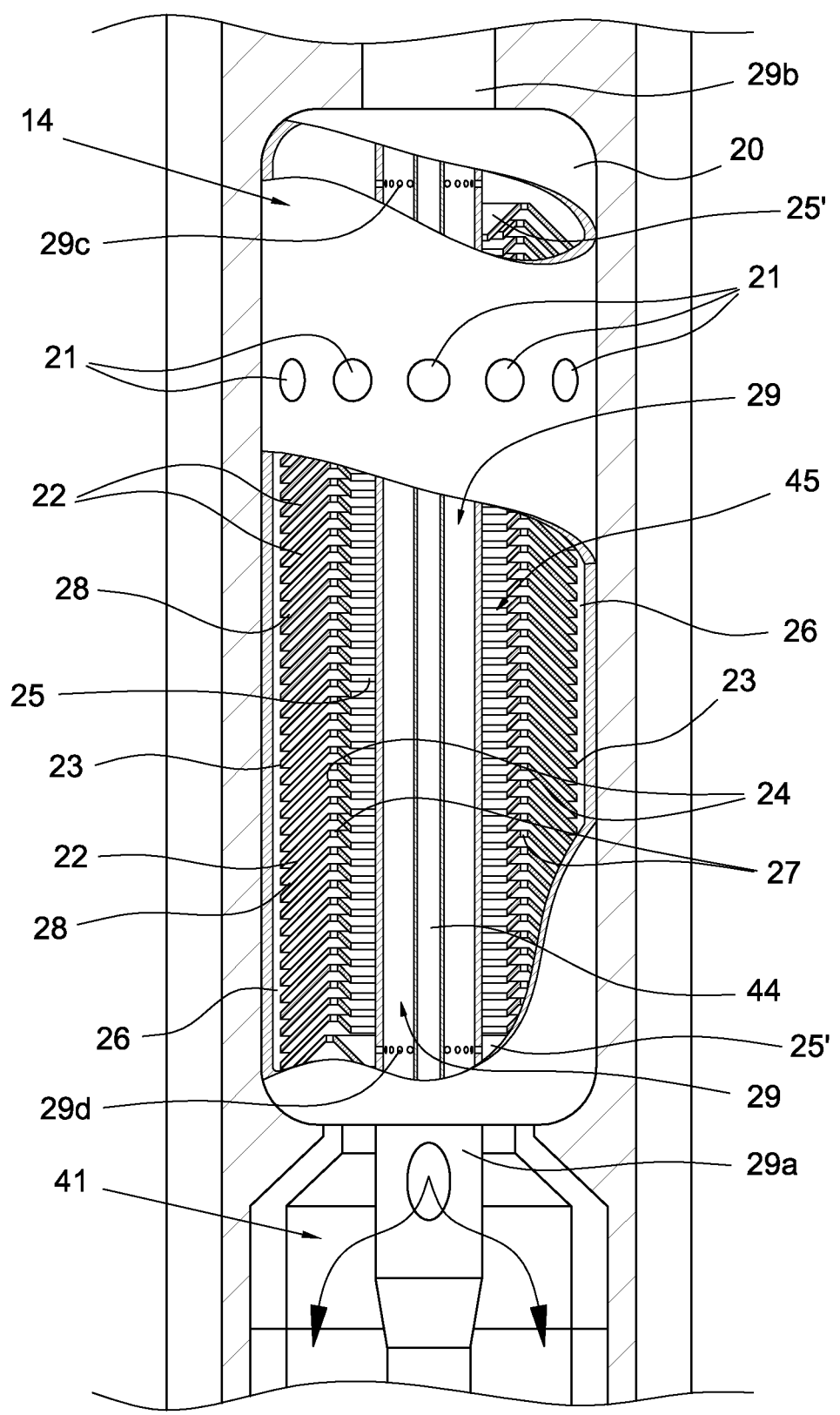
FIG. 2 is an enlarged, partially cross-sectional detail, of the separation group of FIG. 1 which illustrates the structure of the coalescence separation device used in the same.

As shown in FIG. 2, inside the tubular body 20, at least one set of coalescence plates 22 is housed, which are arranged parallel and one upon the other forming a stack.

Each of the coalescence plates 22 has a truncated-conical form, internally hollow and open in correspondence with the larger base and smaller base, different embodiments as described in the co-pending patent application of the same Applicant, are not excluded however.

The coalescence plates 22 are preferably arranged mutually parallel at a reciprocal distance ranging from 2 mm to 5 mm, defining a stack. Between a pair of coalescence plates 22, a flow channel 28 of the mixture to be separated is thus defined, along which the mixture flows, separating into two components by climb of the drops inside of the channels and their coalescence and collection in the high part of the channel.

The set of coalescence plates 22 is housed in the tubular body 20 coaxially to it with the larger base and smaller base of the coalescence plates 22 respectively facing the end of the tubular body 20 at a lower height and the end of the tubular body 20 at a greater height.

Each coalescence plate 22 has a lower edge 23 and an upper edge 24 with a circular profile respectively defined by the larger base and the smaller base of the truncated cone.

The upper edge 24 extends into a lip 25 folded towards the inside of the truncated cone so as to define a groove with the surface of the truncated cone, in correspondence with which the separated phase with lower specific density accumulates and contemporaneously favouring the outflow of the phase with greater specific density. Along the transition area between the surface of the truncated cone and the lip 25, there is a crown of disengaging through holes 27 of the liquid phase with lower specific density.

The set of truncated-conical coalescence plates 22 is housed in the tubular body 20 so that between the lower edges 23 of the coalescence plates 20 themselves and the internal side surface of the tubular body 20, an annular interspace is defined, which forms a distribution channel 26 of the mixture to be separated for feeding the single flow channels 28.

The distribution channel 26 extends in a direction substantially parallel to the axis of the tubular body 20 and is in fluid communication with the plurality of introduction holes 21.

Said set of coalescence plates 22 also defines, centrally with respect to the coalescence plates 22, an outflow channel 45 of the fluid phase with greater specific density, wherein the fluid phase with greater specific density flows towards a lower height.

The outflow channel 45 extends in a direction substantially parallel to the axis of the tubular body and is delimited by the upper edges 24 (smaller bases) of the truncated-conical coalescence plates 22.

Inside the outflow channel 45 and coaxially to the same, there is an outflow duct 29 for conveying of the fluid phase with greater specific density towards a lower emission mouth 29a.

The outflow channel 45 therefore has an annular section, and is also closed above by the lip 25' of the coalescence plate at the end at superior height of the set which has a greater length and extends as far as the outflow duct 29.

The outflow duct 29 has a crown of upper holes 29c and a crown of lower holes 29d, for the inlet of the fraction of fluid phase with lower specific density and fluid phase with greater specific density, respectively.

Such outflow duct 29 is also in fluid communication above with the gravitational separation chamber 13 and below with the lower outlet mouth 12b.

The fluid connection between the upper emission mouth 29b of the outflow duct 29 and the gravitational separation chamber 13 is obtained for example through the conveyance tube of the fluid phase with lower specific density 17 as implemented in the embodiments illustrated in FIGS. 1 and 3.

Otherwise, such fluid connection with the gravitational separation chamber 13 is obtained by means of a side duct 19 suitable for allowing the oily phase deriving from the fine separation to flow into the gravitational separation chamber 13, above the production holes 33.

The fluid connection with the lower outlet mouth 12b is made, for example, by the interpositioning of specific pumping means 40 suitable for drawing the finely deoiled aqueous phase from the lower emission mouth 29a of the outflow duct 29, and sending it through such lower outlet mouth 12b (see FIGS. 1 and 3).

For this purpose, the pumping means 40 are enclosed inside a containment chamber of the pumping means 41 situated downstream of the coalescence separator 14 with respect to the flow of the fluid phase with greater specific density, and in fluid connection with the lower emission mouth 29a of the outflow duct 29 of the same 14.

The pumping means 40 include a pump 42, preferably a multistep submersed centrifugal electro-pump at the downhole, coupled with a motor 43, for example an electrical submersible motor.

For the feeding of the pumping means 40, a hollow pipe 44 for the passage of electric wires extends downwards from the surface into the pipe coating 30, passing inside the coalescence separator 14, preferably inside the outflow duct 29 of the same 14, and continuing towards the containment chamber of the pumping means 41.

Otherwise, the connection between the lower emission mouth 29*a* and the lower outlet mouth 12*b* is direct. In these embodiments, the pumping means 40 can be positioned, with respect to the flow of the fluid phase with greater specific density, upstream of the at least a second lower fine separation device 14, 14', as shown in FIG. 4, or positioned downstream of the lower outlet mouth 12*b* (embodiment not illustrated).

In case of pumping means 40 be situated upstream of the at least a second lower fine separation device 14, 14', said pumping means 40 draw the fluid phase with greater specific density grossly separated, from the gravitational separation chamber 13, sending it into the containment chamber of the coalescence separator 14*a* and therefore into the inlet of said coalescence separator 14.

Figure 5:
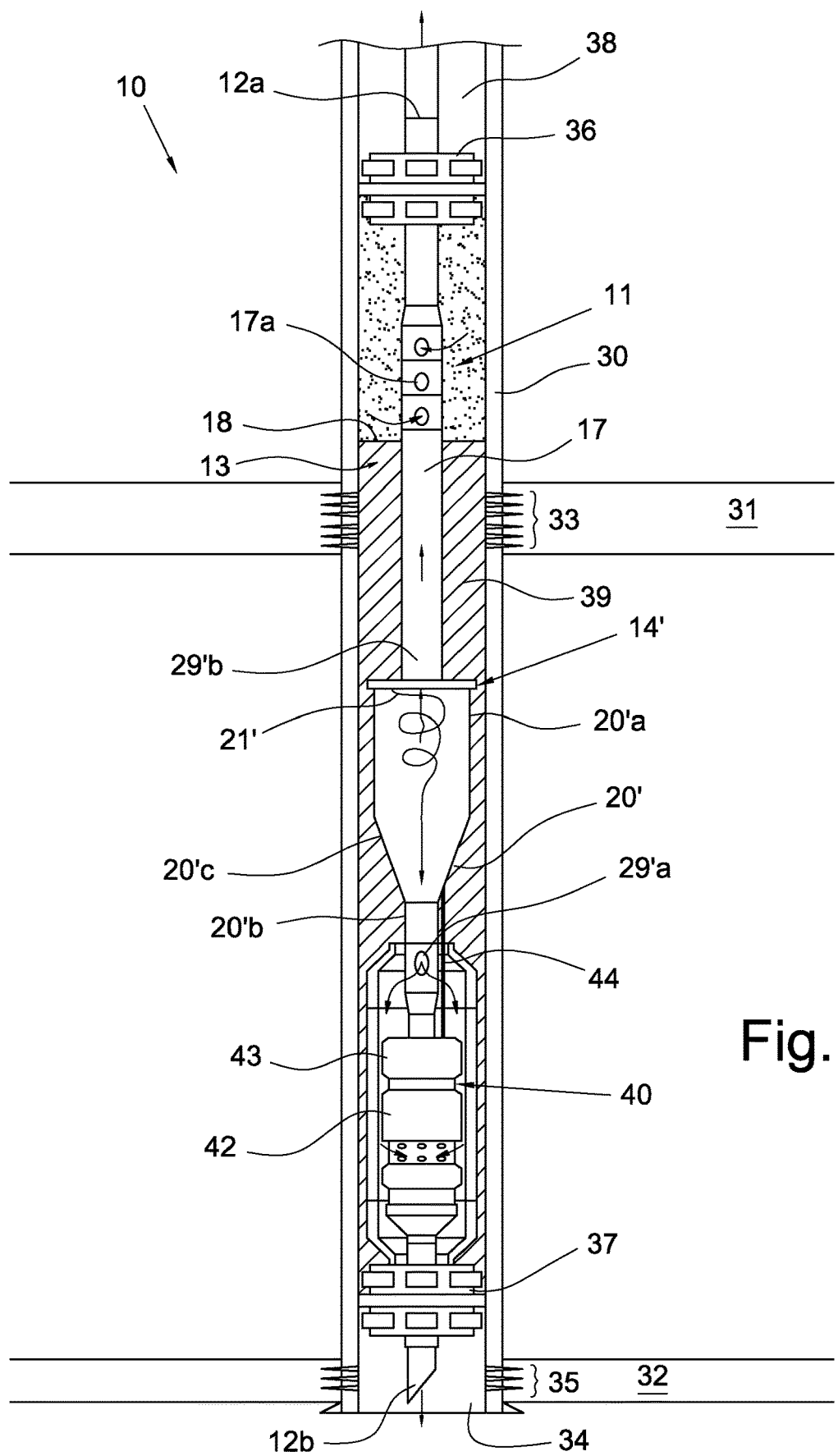
FIG. 5 is an elevational view of a fourth embodiment of the separation group of a mixture comprising two fluid phases mutually immiscible and with different specific density according to the present invention.

Alternatively or additionally to the coalescence separator 14, the at least a second lower fine separation device 14, 14' preferably comprises a hydrocyclone separator 14', as shown for example in FIG. 5 or of another known type for downhole applications.

The hydrocyclone separator 14' comprises a hollow tubular body 20' which has a first cylindrical portion 20'*a* with larger diameter situated at an upper height and a second cylindrical portion 20'*b* with smaller diameter situated at a lower height, connected to each other by a third portion 20'*c* with tapered conformation.

In the hollow tubular body 20', at least one introduction mouth 21' tangential to the internal wall of the tubular body 20' is provided, in fluid connection with the lower part of the gravitational separation chamber 13 in which the grossly deoiled aqueous phase is present.

The particular geometry of the hollow tubular body 20' induces the two fluid phases with different specific weights to rotate at a high velocity. Such rotations induce the heavier fluid phase (water) to go towards the outside and subsequently towards a lower emission mouth 29'*a*, whereas the lighter fluid phase (oil) is sent towards the inside and subsequently towards an upper emission mouth 29'*b*.

The lower emission mouth 29'*a* is preferably in fluid communication with the lower outlet mouth 12*b* through the interpositioning of specific pumping means suitable for drawing the finely deoiled aqueous phase from the lower emission mouth 29'*a* and sending it through the lower outlet mouth 12*b*.

The upper emission mouth 29'*b* of the hollow tubular body 20' is in fluid communication with the gravitational separation chamber 13, preferably through the conveyance tube of the fluid phase with lower specific density 17.

Figure 4:
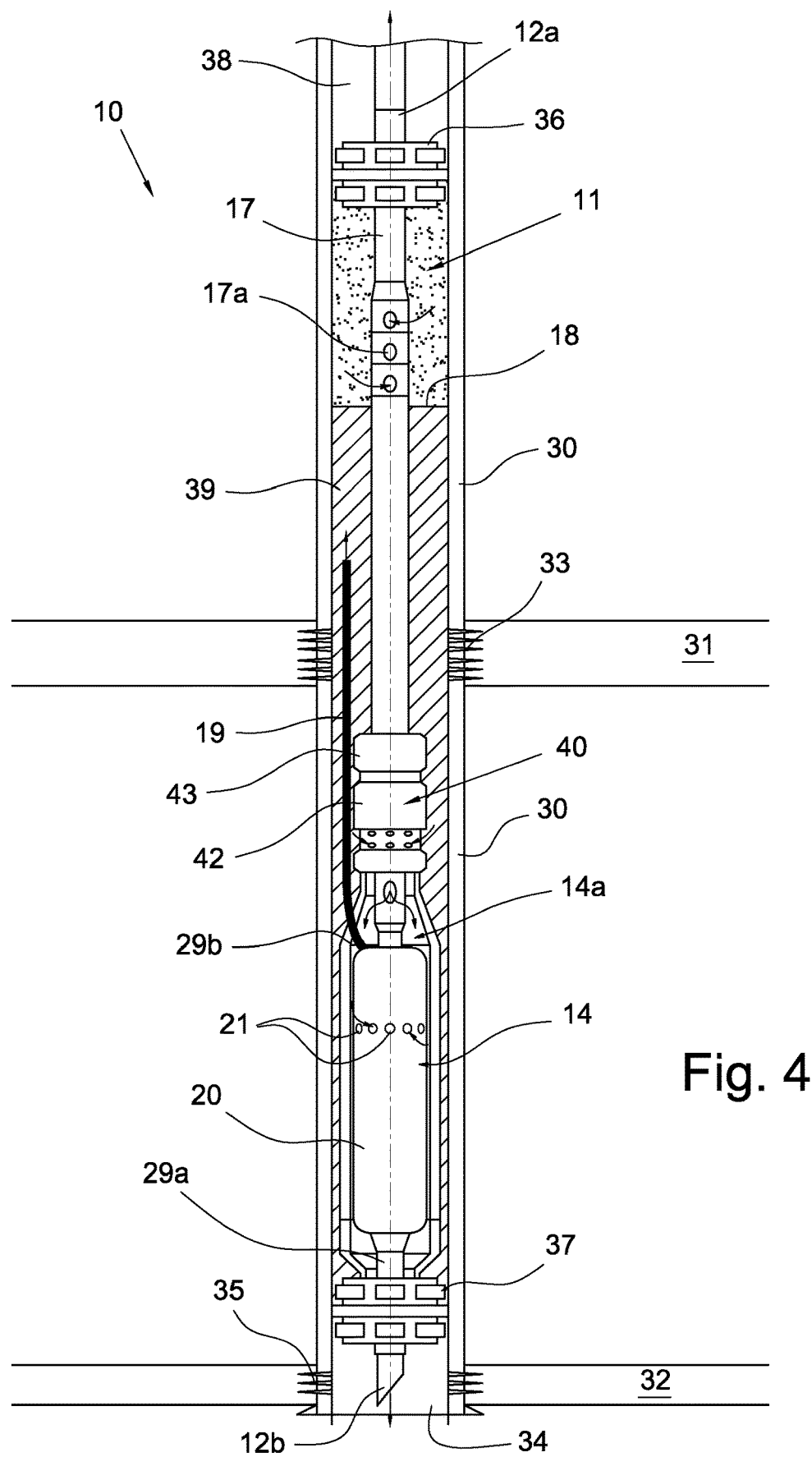
FIG. 4 is an elevational view of a third embodiment of the separation group of a mixture comprising two fluid phases mutually immiscible and with different specific density according to the present invention.

The embodiments of the separation group 10 of a mixture comprising two fluid phases mutually at least partially immiscible and with different specific density illustrated in FIGS. 1, 4 and 5 are particularly suitable in the case of oil wells with sufficiently extensive space between the production area 31 and reinjection area 32, which is such as to allow the positioning of the group 10 inside the well in correspondence with the space separating the two areas 31, 32.

Otherwise, the embodiment of the separation group 10 of a mixture comprising two fluid phases mutually at least partially immiscible and with different specific density illustrated in FIG. 3 is particularly suitable for oil wells with limited space between the production area 31 and reinjection area 32.

The embodiment illustrated in FIG. 4 can be advantageously used when maintenance or assembly operations must be effected, which require direct access to the at least a second lower fine separation device 14, 14' without having to remove the pumping means 40.

The functioning of the separation group 10 of a mixture comprising two fluid phases mutually at least partially immiscible and with different specific density is described hereunder with reference to the preferred downhole application.

Initially a first introduction phase of a mixture of two fluid phases mutually at least partially immiscible and with different specific density into the separation group 10 takes place according to the present invention.

In this case, the production fluid of the well, consisting of a mixture of an aqueous phase in which an oily phase is emulsified and/or suspended in the form of droplets, enters, at a certain rate, in the gravitational separation chamber 13 of the separation groups 10 according to the invention, through the production holes 33 or inlet holes 15 made on the mantle of the tubular casing 16.

The rate of the fluid entering the gravitational separation chamber 13, is reduced, allowing a longer residence time for the droplets of oily phase to join together to form larger drops favouring the gravitational effect which tends to separate the aqueous phase from the oily phase. This causes a distinct upward movement of the drops of oily phase originally emulsified and/or suspended and the formation of the water-oil interface 18 between the grossly deoiled aqueous phase, i.e. still containing small droplets of oil, and the oily phase.

The production fluid of the well is then initially subjected to a gross separation phase which takes place by gravity.

A first portion of the oily phase separated is then sent towards the upper outlet mouth 12*a* of the separation group 10, whereas the grossly separated aqueous phase is subjected to at least one fine separation phase.

Such fine separation phase takes place by coalescence through a specific coalescence separator 14 and/or due to a vortical effect through a cyclone separator 14'.

After at least one fine separation phase, a second portion of the phase with lower specific density deriving from the fine separation, is made to flow with the first portion of the phase with lower specific density deriving from the gross separation, whereas the phase with greater specific density deriving from the fine separation is sent through the lower outlet mouth 12*b* of the separation group 10.

In the case of downhole applications, the fine separation phase takes place as described hereunder.

The grossly deoiled aqueous phase coming from the gravitational separation chamber 13 enters—directly or passing through the pumping means 40—in the second lower fine separation device 14, 14', where the remaining droplets, still emulsified and/or suspended, tend to further separate from the aqueous phase by coalescence or vortical effect depending on the particular fine separation device 14, 14' used.

In the case of a fine separation device 14 by coalescence, the droplets emulsified and/or suspended in the grossly deoiled aqueous phase tend to join forming a layer of oily phase which is collected in the upper part of the coalescence separator 14 from where it exits through the upper emission mouth 29b.

The oil-enriched phase then rises inside the conveyance tube of the fluid phase with lower specific density 17, encountering in its ascent, the oily phase separated in the gravitational separation chamber which enters in the same tube 17 through the at least one fluid communication hole 17a between the gravitational separation chamber 13 and the upper outlet mouth 12a.

In the embodiment illustrated in FIG. 4, the ascent of the oil-enriched phase takes place through the side duct 19, outside the conveyance tube 17, towards the gravitational separation chamber 13 where it reascends towards the water-oil interface 18, flowing into the oil-enriched fluid separated by gravity.

From here, the oil-enriched phase comprising both the portion separated by gravity and the portion separated by coalescence, enters, through the at least one fluid communication hole 17a between the gravitational separation chamber 13 and the upper outlet mouth 12a, and flows towards the surface.

The finely deoiled aqueous phase is collected at the bottom of the coalescence separator 14 from where it exits through the lower emission mouth 29a, culminating, depending on the specific embodiment, directly in the lower outlet mouth 12b or indirectly, passing first inside the containment chamber 41 of the pumping means and through the pumping means 40 themselves.

From here, the finely deoiled aqueous phase culminates in the reinjection area 32.

The passage of the grossly deoiled aqueous phase through the fine separation device 14, 14' and the flow of the finely deoiled aqueous phase through the lower outlet mouth 12b are induced by the action of pumping means 40.

Analogously, in the case of a hydrocyclone fine separation device 14', once the two fluid phases having different specific weights have been introduced into the same 14', they tend to rotate at different velocities, separating itself.

The heavier fluid phase tends to move towards the outside ending in the lower outlet mouth 12b, and from here into the reinjection area 32, passing first inside the containment chamber 41 of the pumping means and through the pumping means 40 themselves.

The lighter fluid phase, on the other hand, is sent towards the inside and from here towards the upper emission mouth 29'b. The lighter fluid phase then rises inside the conveyance tube of the fluid phase with lower specific density 17, encountering in its ascent, the oily phase separated in the gravitational separation chamber which enters in the same tube 17 through the at least one fluid communication hole 17a between the gravitational separation chamber 13 and the upper outlet mouth 12a.

The characteristics of the separation apparatus between fluids having different densities, object of the present invention, as also the relative advantages are evident from the above description.

By coupling a first gross separation by gravity with at least a subsequent fine separation effected by coalescence, by vortical effect or by combination of both, there is the advantages of increasing the overall separation efficiency.

It is therefore possible to obtain an oil-enriched stream which can be sent towards the surface and dispose of the finely deoiled water in the re-injection area, without, however, causing a decline in the infectivity of an oil well.

Furthermore, the preferred embodiments illustrated in FIGS. 1 and 3 which, by using pumping means downstream of the fine separation, and therefore only on finely deoiled water, almost completely eliminate the emulsifying effects of oil and water, further increasing the overall separation efficiency of the separation group.

Finally, it is clear that the separation group thus conceived can obviously undergo numerous modifications and variants, all included in the invention; furthermore, all the details can be substituted by technically equivalent elements. In practice, the materials used, as also the dimensions, can vary according to technical requirements.

The invention claimed is:

1. A downhole separation group for a mixture of two fluid phases consisting of an oily phase with lower density and an aqueous fluid phase with greater density, the downhole separation group comprising:
    a closed chamber which extends between an upper outlet mouth for the oily phase with lower density separated from said mixture, positioned at an upper height, and a lower outlet mouth for the aqueous fluid phase with greater density separated from said mixture, positioned at a lower height with respect to said upper height;
    an inlet for said mixture inside said closed chamber also being present at an interposed height between said upper and lower heights;
    an upper gross separation device comprising a gravitational separation chamber which separates said mixture into a first portion of an oil-enriched phase and a grossly deoiled aqueous phase still containing small quantities of oil;
    a lower fine separation device of said grossly deoiled aqueous phase, the lower fine separation device comprising at least one coalescence separator to further separate the grossly deoiled aqueous phase into a finely deoiled aqueous phase with greater density and a second portion of an oil-enriched phase of lower density, wherein the upper gross separation device and the lower fine separation device are hydraulically connected to each other in succession inside said closed chamber between said upper outlet mouth and said lower outlet mouth;
    wherein said coalescence separator comprises a hollow tubular body equipped with a plurality of introduction holes distributed on the side surface of said hollow tubular body, said plurality of introduction holes being in fluid connection with said gravitational separation chamber for the introduction into said hollow tubular body of said grossly deoiled aqueous phase, at least one set of coalescence plates arranged mutually parallel one upon the other being housed inside said hollow tubular body and coaxially to the same, each of said coalescence plates with truncated-conical form, internally hollow and being open in correspondence with the larger base and smaller base, each of said coalescence plates being positioned with said larger base and said smaller base respectively facing an end of said hollow tubular body at a lower height and an end of said hollow tubular body at an upper height so as to define a lower edge and an upper edge with a circular profile, said at least one set of coalescence plates being housed in said tubular body so as to define a distribution channel of said grossly deoiled aqueous phase to be separated configured with an annular interspace between said lower edge of said coalescence plates and the internal side surface of said hollow tubular body, said at least one set of coalescence plates also defining, centrally with respect to said coalescence plates, an outflow channel of said finely deoiled aqueous fluid phase with greater density and at least a fraction of said second portion of an oil-enriched fluid phase with lower density in fluid communication with an outflow duct inside and coaxial to said outflow channel, said outflow duct terminating in an upper emission mouth and a lower emission mouth respectively, for the discharge of said phases with lower and greater density finely separated, said lower emission mouth being in fluid communication with said lower outlet mouth and said upper emission mouth being in fluid communication with said gravitational separation chamber,
- wherein the upper edge of each of said coalescence plates extends into a lip folded towards the inside of said truncated cone so as to define a groove with the surface of the truncated cone, in correspondence with which the separated phase with lower density accumulates and contemporaneously favoring the outflow of the finely deoiled aqueous phase with greater density, and wherein the lip defines a curvature along which there is a crown of detaching pass-through holes of said second portion of an oil-enriched fluid phase with lower density; and
- a conveyance tube of the oil-enriched fluid phase with lower density extending from said upper outlet mouth through said gravitational separation chamber and connecting below with said lower fine separation device, said conveyance tube of the fluid phase with lower density having at least one hole to convey said first and second portions of an oil-enriched phase towards said upper outlet mouth.

2. The separation group according to claim 1, wherein said inlet is situated in correspondence with said gravitational separation chamber.

3. The separation group according to claim 1, wherein said closed chamber is laterally delimited by a tubular casing, inside said tubular casing is said conveyance tube of the fluid phase with lower density, and said gravitational separation chamber defined by said tubular casing and said conveyance tube of the fluid phase with lower density, has an annular section.

4. The separation group according to claim 1, wherein said upper emission mouth is in fluid communication with said gravitational separation chamber through said conveyance tube of the fluid phase with lower density.

5. The separation group according to claim 1, wherein said upper emission mouth is in fluid communication with said gravitational separation chamber through a side duct outside said coalescence separator.

6. The separation group according to claim 1, further comprising pumping means suitable for collecting said fluid phase with greater density finely separated, from said lower emission mouth and sending it through said lower outlet mouth.

7. The separation group according to claim 1, wherein said pumping means are enclosed inside a containment chamber of the pumping means situated downstream of said coalescence separator with respect to the flow of said fluid phase with greater density, and in fluid connection with said lower emission mouth.

8. The separation group according to claim 1, further comprising pumping means interposed between said gravitational separation chamber and said coalescence separator suitable for collecting said grossly deoiled aqueous phase from said gravitational separation chamber and sending it inside a containment chamber of said coalescence separator.

9. The separation group according to claim 1, wherein said lower fine separation device further comprises a hydrocyclone separator.

10. The separation group according to claim 9, wherein said hydrocyclone separator comprises a hollow tubular body which has a first cylindrical portion with larger diameter situated at an upper height and a second cylindrical portion with smaller diameter situated at a lower height connected by a third portion with tapered conformation, at least one introduction mouth tangential to the inner wall of said tubular body being provided in said hollow tubular body, in fluid connection with said gravitational separation chamber for the introduction into said hollow tubular body of a mixture previously grossly separated, said hollow tubular body comprising an upper emission mouth and a lower emission mouth respectively for the discharge of said phases with lower and greater density finely separated, said upper emission mouth being in fluid connection with said gravitational separation chamber, said lower emission mouth being in fluid connection with said lower outlet mouth.

11. The separation group according to claim 10, wherein said upper emission mouth is in fluid connection with said gravitational separation chamber through said conveyance tube, and that said lower emission mouth is in fluid connection with said lower outlet mouth through the interpositioning of pumping means.

12. A method for the separation of a mixture comprising two fluid phases mutually at least partially immiscible and with different density comprising:
- introducing a mixture of two fluid phases mutually at least partially immiscible and with different density into a separation group to separate the mixture into an oil-enriched phase with lower density and a deoiled aqueous phase with greater density;
- subjecting said mixture to a first gross separation phase by gravity obtaining a first portion of an oil-enriched fluid phase with lower density and an aqueous fluid phase with greater density grossly separated;
- sending said first portion of the oil-enriched fluid phase with lower density towards an upper outlet mouth of said separation group;
- subjecting said aqueous fluid phase with greater density grossly separated to at least one fine separation phase obtaining a second portion of an oil-enriched fluid phase with lower density and an aqueous fluid phase with greater density finely separated; and
- sending said second portion of the oil-enriched fluid phase with lower density towards said upper outlet mouth of said separation group and said aqueous fluid phase with greater density finely separated towards a lower outlet mouth of said separation group;
- wherein said separation group is a separation group according to claim 1.

13. The separation method according to claim 12, wherein said at least one fine separation phase takes place by coalescence.

* * * * *

UNITED STATES PATENT AND TRADEMARK OFFICE
CERTIFICATE OF CORRECTION

PATENT NO. : 11,180,396 B2
APPLICATION NO. : 13/976322
DATED : November 23, 2021
INVENTOR(S) : Andreussi et al.

It is certified that error appears in the above-identified patent and that said Letters Patent is hereby corrected as shown below:

On the Title Page

Item (75) Inventors:
Reads "Domenico Antonio Direnzo, Casirate D'adda (IT")
Should read --Domenico Antonio Di Renzo, Casirate D'adda (IT)--

Signed and Sealed this
Twenty-eighth Day of March, 2023

Katherine Kelly Vidal
*Director of the United States Patent and Trademark Office*